April 8, 1969     E. W. DUNDAS ETAL     3,436,811
METHOD FOR ENCAPSULATING DYNAMOELECTRIC MACHINE
STATORS USING A CONFORMABLE SLEEVE
Filed Feb. 14, 1966
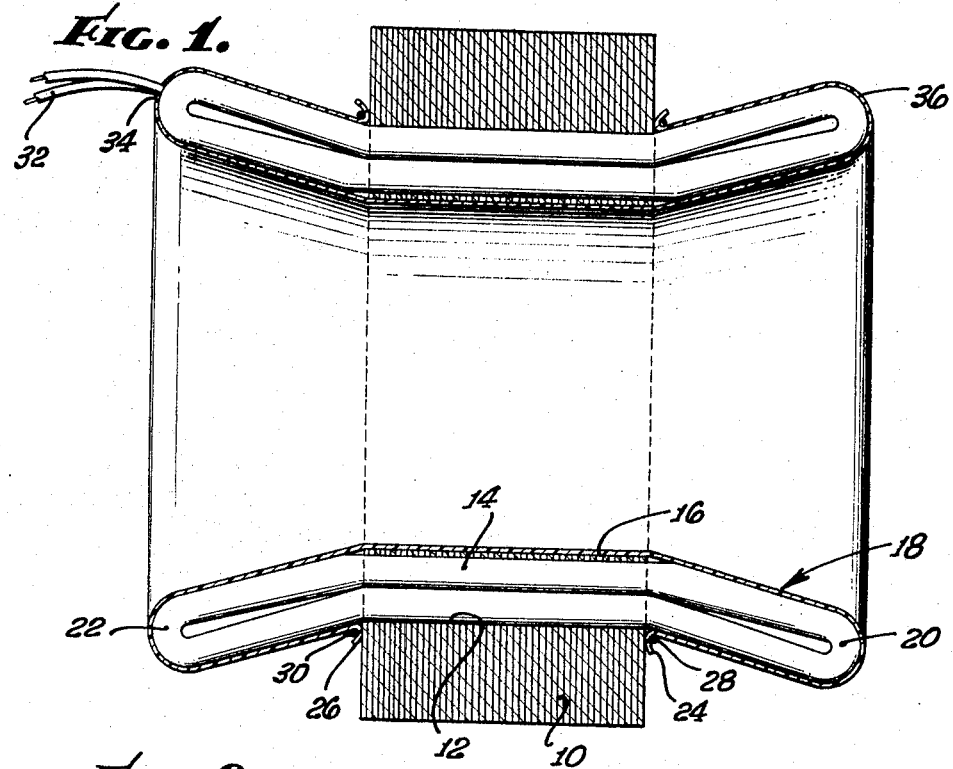
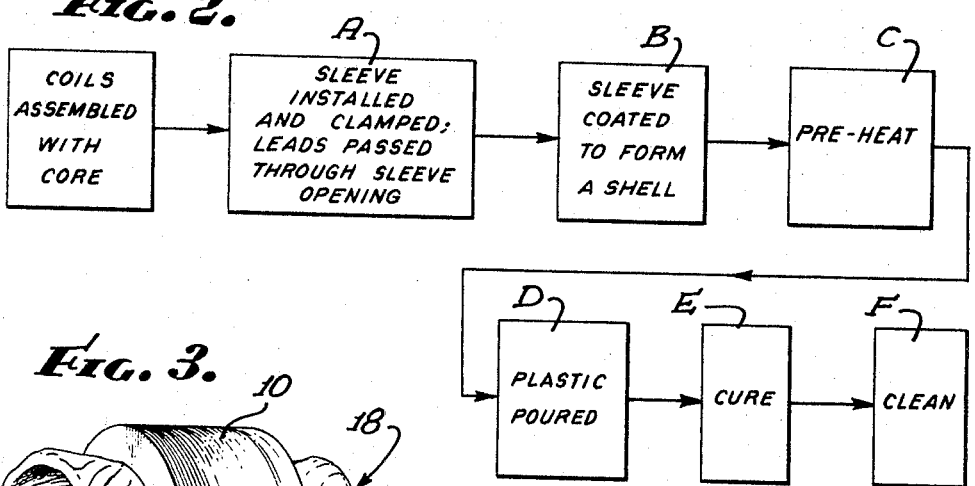
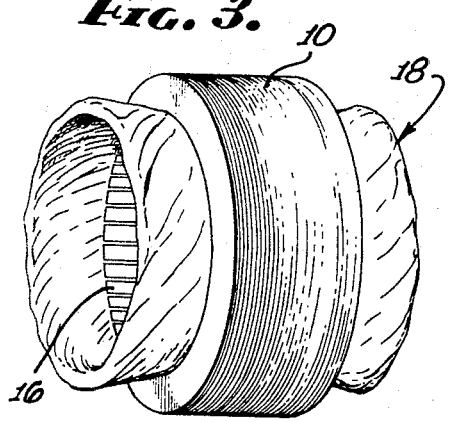
INVENTORS.
ERNEST W. DUNDAS
STANLEY P. WALKER
By Flam and Flam
ATTORNEYS.

United States Patent Office 3,436,811
Patented Apr. 8, 1969

3,436,811
METHOD FOR ENCAPSULATING DYNAMOELECTRIC MACHINE STATORS USING A CONFORMABLE SLEEVE
Ernest W. Dundas, Anaheim, and Stanley P. Walker, La Habra, Calif., assignors to Emerson Electric Co., St. Louis, Mo., a corporation of Missouri
Filed Feb. 14, 1966, Ser. No. 527,266
Int. Cl. H02k 15/14
U.S. Cl. 29—596      2 Claims

ABSTRACT OF THE DISCLOSURE

A flexible tube of conformable, stretchable fabric having the same diameter as the stator bore is inserted through the stator bore. The ends of the tube are closely wrapped about the end turns of the stator coils and fastened to the end laminations in close proximity to the coil slots. The fabric is sprayed with a thermosetting plastic or with epoxy resin to form a shell. Finally, epoxy material is inserted into the shell and the windings thus encapsulated. The stator bore is cleaned, as by machining, after the mold has cured.

Brief summary of the invention

This invention relates to electrical motors, and particularly to electrical motors in which the stator windings are isolated from the surrounding medium and insulated by being encapsulated in a plastic material.

Various methods have been proposed for molding the plastic material about the stator core and the windings. A mold structure for this purpose is shown and described in Luenberger Patent No. 2,749,456, issued June 5, 1956, entitled, Waterproof Stator Construction for Submersible Dynamo-Electric Machine, and in O'Connor Patent No. 3,058,156, issued Oct. 16, 1962, entitled, Mold Structure for Encapsulating Dynamoelectric Machinery. In this and other systems, the thickness of the epoxy material is excessive since the mold does not closely conform to the configuration of the end turns. The result is inefficient heat dissipation and burdensome weight. Some of the excess plastic material could be removed subsequent to the molding process, or a complicated mold could be devised. Yet the optimum amount of the molded material could not be removed without danger of exposing the windings.

The primary object of this invention is to provide a system for effectively and reliably encapsulating motor windings with the absolute minimum of plastic material. Another object of this invention is to provide a system of this character that is simple and inexpensive.

In order to accomplish these objects, a flexible tube of conformable, stretchable fabric having the same diameter as the stator bore is inserted through the stator bore. The ends of the tube are closely wrapped about the end turns of the stator coils and fastened to the end laminations in close proximity to the coil slots. The fabric is sprayed with a thermosetting plastic or with epoxy resin to form a shell. Finally, epoxy material is inserted into the shell and the windings thus encapsulated. The stator bore is cleaned, as by machining, after the mold has cured.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true to scale. This form will now be described in detail, illustrating the general principles of the invention; but it is to be understood that this detailed description is not to be taken in a limiting sense, since the scope of this invention is best defined by the appended claims.

Brief description of the drawings

FIGURE 1 is an axial sectional view of a stator structure with a fabric sleeve inserted and tied preparatory to spraying and molding;

FIG. 2 is a block diagram indicating the processing of the stator structure; and FIG. 3 is a pictorial view of the completed stator structure.

Detailed description

In FIG. 1, there is illustrated a stack of stator laminations forming a stator core 10. The core provides, in a conventional manner, a series of slot windings 12 in which windings 14 have been installed. Extending through the stator bore 16 is a sleeve 18 made of flexible, conformable fabric material having elastic or at least stretch characteristics. Suitable materials for this purpose are known under trademarks Spandex, Helanca, etc.

The nominal diameter of the sleeve 18 corresponds substantially to the diameter of the stator bore 16 so that a close fit is achieved. The ends of the sleeve are stretched and tightly wrapped around the end turns 20 and 22 of the windings 14. The ends 24 and 26 of the sleeve are secured to the end laminations of the core 10. The ends are secured by any suitable clamping means, for example by flexible cords 28 and 30. These cords are tied tightly so as to bring the ends 24 and 26 close to the slots 12 where the winding ends 20 and 22 emerge.

The leads 32 are passed through a small access aperture 34 positioned at the point of the bend at one of the end turns 22. As indicated in FIG. 2, after the sleeve is installed and clamped and the leads passed through the aperture 34 (step A), the entire area of the sleeve is coated (step B), including the intermediate portion passing through the stator bore 16. The interstices of the fabric are closed and sealed as the coating hardens sufficiently to acquire a degree of rigidity. An effective shell or molding chamber is formed for receiving fluid plastic material. Preferably the coating is accomplished by spraying. Optionally suitable coating could be applied by dipping or by brush application. However, by spraying, a minimum amount of material is required and the shell quickly hardens.

An inlet hole 36 (FIG. 1) is formed. While pouring (step D), the stator may conveniently be supported in a horizontal position, as by the aid of a simple cradle structure (not shown) Accordingly, the inlet 36 is located at the same angular position of the lead hole 34 so that both can be positioned uppermost.

The assembly is preheated (step C) and the shell then filled (step D). The plastic material, being sufficiently fluent, readily enters the stator slots 12 and is thus conducted to the opposite end of the stator structure. A plurality of inlets could be provided. The stator structure is then put in an oven for curing (step E). Finally, the intermediate portion of the shell that extends along the stator bore 16 is cleaned out (step F), as by machining, and the completed stator structure, as shown in FIG. 3, results.

Since the sleeve 16 conforms closely to the coil ends, only a minimum thickness of epoxy or other plastic or encapsulating material is required, with resulting effective heat transfer. At the same time, the weight of the stator structure is minimized.

The inventors claim:
1. The process of encapsulating a substantially cylindrical stator structure having a bore, slots opening at the bore as well as at the end of the stator structure, and coils in and projecting beyond the ends of the slots, said process comprising: inserting through the stator bore a conformable stretchable substantially cylindrical fabric tubular sleeeve having substantially the same diameter as the stator bore; wrapping the ends of the sleeve tightly about the end turns of the stator windings; clamping the termini of the sleeve to the ends of the stator in close proximity to the coil slots; passing the winding leads through a hole in the sleeve; spraying a sealant on the sleeve to close the interstices thereof; allowing the sealant to harden to form a molding shell; inserting fluid-like plastic material into the molding chamber formed by the shell; curing the plastic material; and thereafter removing that portion of the sleeve that extends through the stator bore, leaving intact portions of the sleeve that are located beyond the stator bore and which encompass the coil ends.

2. The process as set forth in claim 1 in which the plastic material is inserted while the stator structure is substantially horizontally positioned with the leads uppermost, and through an access opening also positioned uppermost.

References Cited

UNITED STATES PATENTS

| | | | |
|---|---|---|---|
| 2,611,930 | 9/1952 | Hill et al. | 264—102 |
| 2,961,555 | 11/1960 | Towne | 310—43 |
| 3,151,262 | 9/1964 | Howard et al. | 310—260 |
| 3,242,358 | 3/1966 | Balke et al. | 310—45 |

WARREN E. RAY, *Primary Examiner.*

U.S. Cl. X.R.

264—272; 310—43, 260